United States Patent [19]

Uenohara

[11] Patent Number: 4,754,861
[45] Date of Patent: Jul. 5, 1988

[54] CLUTCH DISC

[75] Inventor: Norihisa Uenohara, Osaka, Japan

[73] Assignee: Kabushiki Kaisha Daikin Seisakusho, Osaka, Japan

[21] Appl. No.: 39,834

[22] Filed: Apr. 17, 1987

Related U.S. Application Data

[63] Continuation of Ser. No. 753,473, Jul. 10, 1985, abandoned.

[30] Foreign Application Priority Data

Jul. 24, 1984 [JP] Japan .................. 59-112919[U]

[51] Int. Cl.$^4$ .................. F16D 3/14; F16D 3/66
[52] U.S. Cl. .................. 192/106.2; 192/106.1
[58] Field of Search .................. 192/106.2, 106.1; 464/68

[56] References Cited

U.S. PATENT DOCUMENTS

| | | | |
|---|---|---|---|
| 4,036,341 | 7/1977 | Beeskow et al. | 192/106.2 |
| 4,406,357 | 9/1983 | Nagano et al. | 192/106.2 |
| 4,465,172 | 8/1984 | Gatewood | 192/106.2 |
| 4,474,276 | 10/1984 | Loizeau | 192/106.1 |
| 4,526,260 | 7/1985 | Schierling | 192/106.2 |
| 4,548,309 | 10/1985 | Braun | 192/106.2 |
| 4,549,641 | 10/1985 | Ootani et al. | 192/106.2 |
| 4,558,773 | 12/1985 | Schafer | 192/106.1 |
| 4,577,743 | 3/1986 | Raab et al. | 192/106.2 |
| 4,586,595 | 5/1986 | Hartig et al. | 192/106.2 |
| 4,635,780 | 1/1987 | Wiggen | 192/106.2 |

FOREIGN PATENT DOCUMENTS 512009  8/1939  United Kingdom ............ 192/106.2

Primary Examiner—Rodney H. Bonck
Attorney, Agent, or Firm—Armstrong, Nikaido, Marmelstein & Kubovcik

[57] ABSTRACT

Disclosed is a clutch disc having friction washer placed between the flange of spline hub and side plates, wherein an engaging part to be engaged with the inner or outer edge of the friction washer is formed on said flange, a bent part is formed in the plate at the edge of the friction washer opposite to the edge of the friction washer engaged with the flange engaging part and this bent part is engaged with one edge of the friction washer.

5 Claims, 2 Drawing Sheets

CLUTCH DISC

This application is a continuation of application Ser. No. 753,473 filed July 10, 1985, now abandoned.

BACKGROUND OF THE INVENTION

1. Field of the Industrial Use

This invention relates to a clutch disc, and more particularly to one which is designed to generate a stable hysteresis torque.

2. Prior Art

In a conventional clutch disc, for example as shown in FIG. 3, friction washers 104 are provided at both sides of a flange 102 of a spline hub 100, and a hysteresis torque is generated by pressing a friction plate 112, which is linked to a clutch plate 106 and retaining plate 108 and pushed down by a cone spring, to these friction washers 104.

In the conventional example in FIG. 3, however, if a play is caused due to wear in the window parts of clutch plate 106, retaining plate 108, and spline hub 102 in the course of long use, the clutch plate 106 and retaining plate 108 are moved in the radial direction (arrow A) by the force acting in the radial direction of the clutch due to engaging and disengaging action of the clutch, which may possibly lead to collision of these plates against the spline hub. If such collision should occur, the hysteresis torque is suddenly increased, and the engaging and disengaging feeling of the clutch may be extremely spoiled.

OBJECTS OF THE INVENTION

This invention is hence intended to present a clutch disc which may generate a stable hysteresis torque by preventing collision of clutch plate and retaining plate against the spline hub if a play is caused due to wear of the window parts of clutch plate, retaining plate or spline hub in the course of long use, so as to maintain favorable clutch engaging and disengaging feeling.

COMPOSITION OF THE INVENTION

The technical means of this invention to achieve the above discussed objects is a clutch disc having friction washers placed between the flange of spline hub and side plate, wherein an engaging part to be engaged with the inner or outer edge of friction washer is formed on said flange, and a bent part is formed in the plate which abuts against the opposite side of the flange of the friction washer, and this bent part is engaged with the inner or outer edge of the friction washer.

DESCRIPTION OF THE INVENTION

Embodiment

Figure 1:
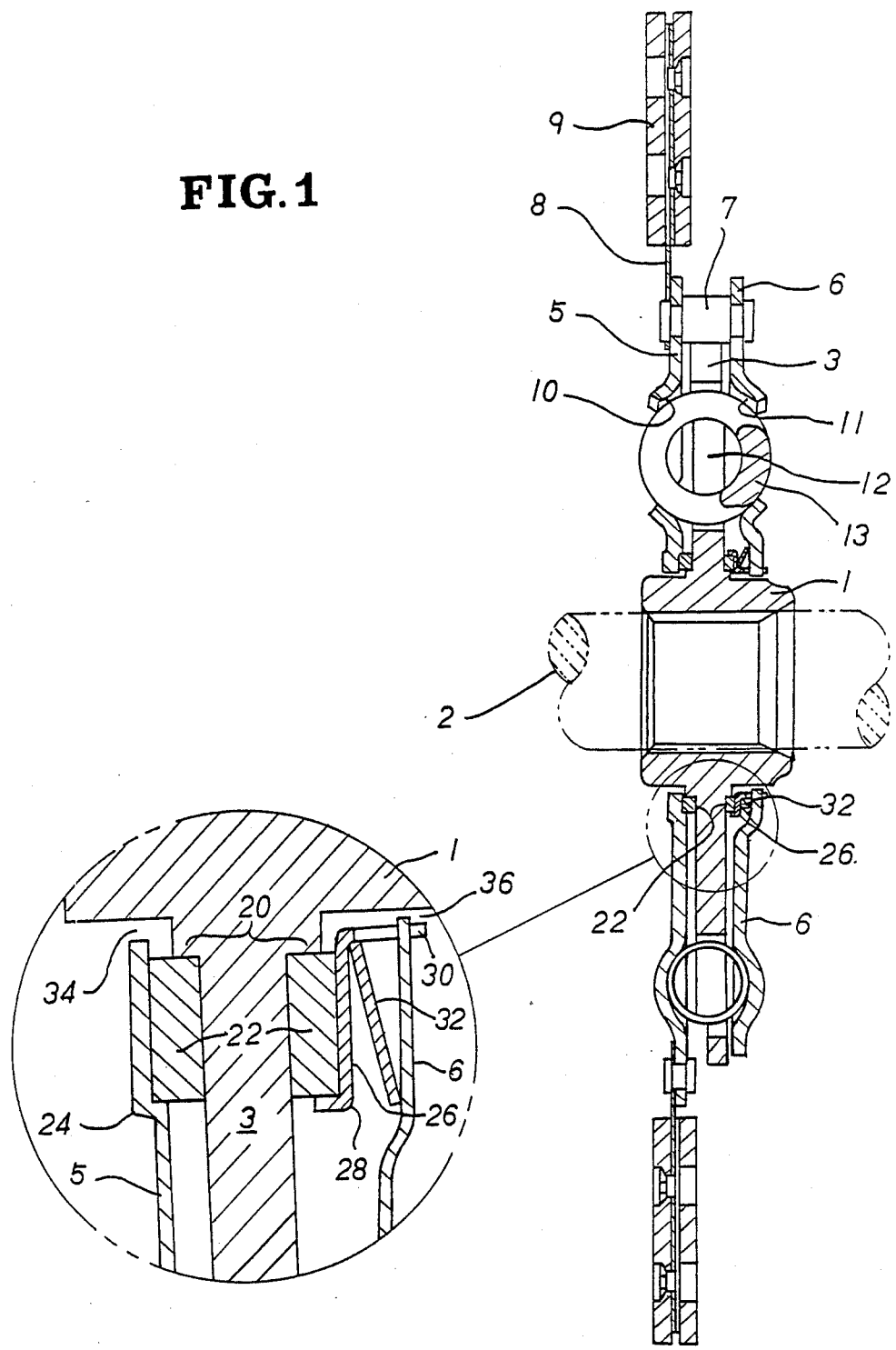
FIG. 1 is a longitudinal sectional view of a clutch disc of this invention.
Figure 3:
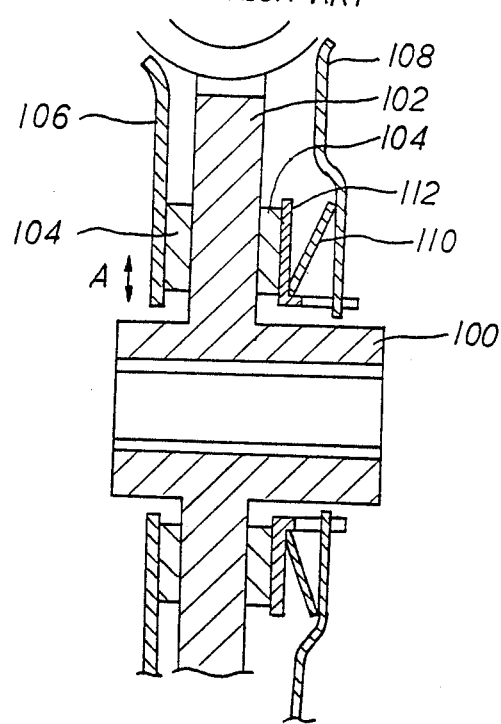
FIG. 3 is a longitudinal sectional partial view showing a conventional example.

In FIG. 1 showing the longitudinal section of a clutch disc of this invention, numeral 1 denotes an output side spline hub, which is spline-fitted to an output shaft 2 and is integrally equipped with an outward flange 3. At both sides of the flange 3, a clutch plate 5 (side plate) and a retaining plate 6 (side plate) are disposed across a spacing, and, the both plates 5, 6 are linked by a stud pin 7. A cushioning plate 8 is fixed on the outside of the clutch plate 5, and input side facings are affixed to the both sides of the cushioning plate 8. The facings 9 are connectably held between flywheel and pressure plate (not shown).

A plurality of window holes 10, 11 are formed in the clutch plate 5 and retaining plate 6, and window holes 12 corresponding to these window holes 10, 11 are also formed in the flange 3, and torsion springs 13 are disposed in these window holes.

Stepped engaging parts 20 are formed at both sides of the inside of the flange 3. Moreover, friction washers 22 for generating hysteresis torque due to friction are provided at both sides of the flange 3, and these friction washers 22 are positioned having an inner part of the inner edges engaging parts 20.

The clutch plate 5 abuts against 22 at the side opposite flange 3 of the friction washer disposed at the left side in FIG. 1. A bent part 24, to be engaged with the outer edge of the friction washer 22, is formed on the entire circumference of the clutch plate 5.

Friction plate 26 abuts against flange 3 of the friction washer 22 at the right side of flange 3 as shown in FIG. 1. A bent part 28 to be engaged with the outer edge of the friction washer 22 is formed on the entire outer circumference of the friction plate 26. Projection 30 at the inner edge of washer 22, extend in the direction of the retaining plate 6 are formed at equal intervals, for example at four positions, on the inner circumference of the friction plate, and are engaged with the retaining plate 6. A cone spring 32 is provided between the friction plate 26 and retaining plate 6 so as to push the friction plate 26 in the direction of flange 3.

In this state, a clearance 34 is provided between the clutch plate 5 and spline hub 1, and a clearance 36 is given between the retaining plate 6 and spline hub 1.

Referring now to the operation, when the force to move the clutch plate 5 and retaining plate 6 acts in the radial direction of the acts by the engaging and disengaging operation of the clutch, because the bent part 24 of the clutch plate 5 is engaged with the outer edge of the friction washer 22 and the friction washer 22 abuts the engaging part 20 of the flange 3, the clearance 34 between the clutch plate 5 and spline hub 1 is always maintained, and collision of spline hub 1 and clutch plate 5 is prevented.

Similarly, because the bent part 28 of the friction plate 26 is engaged with the outer edge of the friction washer 22 and the inner edge of the friction washer 22 abuts the engaging part 20 of the flange and the projections of the friction plate 26 are engaged with the notches in the retaining plate 6, the clearance 36 between the retaining plate 6 and spline hub 1 is always maintained, so that collision of spline hub 1 and retaining plate 6 is prevented.

The frictional force due to the friction washer 22 is mostly generated on the outside, that is, on the contact surface between clutch plate 5 and friction plate 26, and the sliding amount of the contact surface between the friction washer 22 and flange 3 is extremely small. The wear of the friction washer may be negligibly small if the inner face of the friction washer 22 abuts the engaging part 20.

Effects of the Invention

In the clutch disc by this invention, the engaging part 20 to be engaged with the inner edge of the friction washer 22 is formed in the flange 3, bent parts 24, 28 are formed in the clutch plate 5 abutting against the opposite side of the flange 3 of the friction washer 22 and in the friction plate 26, and these bent parts 24, 28 are engaged with the outer edge of the friction washer 22, to provide the following effects.

If a force in the radial direction acts on the clutch plate 5 and retaining plate 6 which is engaged with the friction plate 26 when engaging and disengaging the clutch, these plates 5, 6, 26 do not move in the radial direction, and the clearances 34, 36 against the spline hub 1 is maintained, so that collision of spline hub 1 against plates 5, 6, 26 is prevented.

Play caused in the window parts of the clutch plate 5, retaining plate 6 or spline hub 1 due to long use, will not give rise to sudden increase of hysteresis torque because of collision of spline hub against plates 5, 6, 26, so that a favorable clutch engaging and disengaging feeling will be maintained for a long period of time.

In particular, in the case of a clutch disc with so-called multistage hysteresis characteristics, for example as in the U.S. Pat. No. 4,406,357, because the hysteresis torque by the friction washer 22 is relatively small, it is extremely preferable for generating first stage hysteresis torque.

Other embodiment

Figure 2:
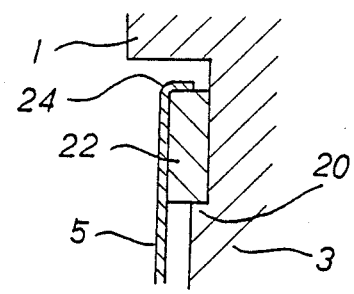
FIG. 2 is a longitudinal sectional partial view showing a diffferent embodiment of this invention.

As shown in FIG. 2, the engaging part 20 may be fitted to the outer edge of the friction washer 22, and the bent part 24 of the clutch plate 5 may be engaged with the inner edge of the friction washer 22.

What is claimed is:

1. A clutch disc having a spline hub, a flange on said hub, side plates at opposite sides of said flange and friction washers between said flange and each of said side plates, wherein an engaging part to be engaged with one edge of the friction washer at one of said opposite sides of said flange is formed on said flange and is fitted with the outer edge of said washer and a bent part is formed on one of said side plates at said one of said opposite sides of said flange, said bent part abutting against the friction washer at said one of said opposite sides of said flange, said bent part engaging the inner edge of said friction washer opposite said outer edge engaging said engaging part of said flange.

2. A clutch disc as set forth in claim 1, wherein a stepped engaging part is formed at the inner side of said flange at the other of said opposite sides of said flange, and the inner part of said friction washer at said other of said opposite sides of said flange is fitted to said stepped engaging part.

3. A clutch disc as set forth in claim 2, wherein said one of said side plates having a bent part to be engaged with said opposite edge of said friction washer at said one of said opposite sides of said flange is on a clutch plate.

4. A clutch disc as set forth in claim 2, wherein a friction plate is pressed against said friction washer at the other of said opposite side of said flange in the direction of said flange by a cone spring bearing against the other of said side plates, and a bent part for engagement with the outer edge of said friction washer is formed on the outer circumference of said friction plate, a plurality of projections are formed on the inner circumference of said friction plate and said projections engage openings in said other of said side plates.

5. A clutch disc as set forth in claim 1, wherein a clearance is formed by said friction washer at said one of said opposite sides of said flange between one edge of said one of said side plate at said one of said opposite sides of said flange and an outer surface of said spline hub.

* * * * *